(12) United States Patent
Chen et al.

(10) Patent No.: US 9,559,905 B2
(45) Date of Patent: Jan. 31, 2017

(54) TYPE-C RETIMER STATE MACHINE AND A PROTOCOL FOR INBAND CONTROL AND CONFIGURATION

(71) Applicant: Intel Corporation, Santa Clara, CA (US)

(72) Inventors: Huimin Chen, Portland, OR (US); Karthi R. Vadivelu, Folsom, CA (US); Howard L. Heck, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 14/582,597

(22) Filed: Dec. 24, 2014

(65) Prior Publication Data

US 2016/0191313 A1    Jun. 30, 2016

(51) Int. Cl.
*H04L 12/24* (2006.01)
*H04W 52/28* (2009.01)
*H04L 12/12* (2006.01)

(52) U.S. Cl.
CPC ........... *H04L 41/0816* (2013.01); *H04L 12/12* (2013.01)

(58) Field of Classification Search
CPC .................. H04L 14/0816; H04W 52/287
USPC ......................................................... 370/315
See application file for complete search history.

(56) References Cited

U.S. PATENT DOCUMENTS

| | | | |
|---|---|---|---|
| 6,014,704 A * | 1/2000 | Fischer | G06F 13/385 709/230 |
| 2005/0261609 A1* | 11/2005 | Collings | A43B 3/0005 600/592 |
| 2015/0378952 A1* | 12/2015 | Chen | G06F 13/423 710/105 |
| 2016/0092381 A1* | 3/2016 | Chen | G06F 13/22 710/104 |

OTHER PUBLICATIONS

Chen, et al., "Method and apparatus of an inband signaling for non-USB traffic", U.S. Appl. No. 14/498,474, filed on Sep. 26, 2014.
Chen, et al., "Method and Apparatus of USB 3.1 Retimer Presence Detect and Index", U.S. Appl. No. 14/317,874, filed on Jun. 27, 2014.

* cited by examiner

*Primary Examiner* — Ronald B Abelson
(74) *Attorney, Agent, or Firm* — International IP Law Group, P.L.L.C.

(57) ABSTRACT

An apparatus for retimer configuration and control is described herein. The apparatus includes at least one retimer. The is to receive an inband low frequency periodic signal (LFPS), and to send an inband LFPS based pulse width modulation message (LBPM) in response to the inband LFPS. The retimer is configured by decoding the LBPM.

22 Claims, 8 Drawing Sheets

| Field Type | Description | Sub-Field | Description | Sub-Field | Description |
|---|---|---|---|---|---|
| b0: Protocol Type | 0: Single LBPM Protocol | b1: IO Configuration | 0: Non-DP Mode | b3~b2: IO Protocol | 00: USB 3.1; 01: PCIe 3; 10: Debug Mode; 11: Reserved |
| | | | | b6~b4: (Reserved) | Extension for Multi-Lane PCIe/USB 3.1 Configuration |
| | | | | b7: Active Lane | 0: In-Order; 1: Out-Order |
| | | | 1: DP Mode | b4~b2: Bit Rate | 000: RBR; 001: HBR1; 010: HBR2; 011: HBR3; 1xx: reserved (USB_BR; rate Matching) |
| | | | | b6~b5: Lane Configuration | 00: x1; 01: x2; 10: x4; 11: Reserved |
| | | | | b7: Lane Order | 0: In-Order; 1: Out-Order |
| b0: Multi-LBPM Protocol | Reserved | | | | |

| Field Type | Description | Sub-Field | Description | Sub-Field | Description |
|---|---|---|---|---|---|
| b0: Protocol Type | 0: Single LBPM Protocol | b4~b1: IO Configuration | Basic Feature for Walkup Port: <br>0000: Single Port USB3.1 <br>0001: Single Port DP <br>0010: USB3.1+DP <br>0011: Ext Mode <br>Dock Extension: <br>0100: Single Port PCIe3 <br>0101: USB3.1+PCIe3 <br>0110: USB3.1+USB3.1 <br>0111: PCIe3+DP <br>1xxx: Reserved | b5: Active Lane | 0: In-Order; <br>1: Out-Order |
|  | 1: Multi-LBPM Protocol | Reserved |  | b6~b7: Reserved |  |

TYPE-C RETIMER STATE MACHINE AND A PROTOCOL FOR INBAND CONTROL AND CONFIGURATION

FIELD

The present techniques generally relate to universal serial bus (USB) communications. More specifically, the present techniques relate to a retimer state machine and the configuration thereof.

BACKGROUND

A Type-C Universal Serial Bus (USB) connector is a USB connector that is smaller than previous USB connectors. The Type-C USB connector also enables a connection with a USB receptacle at any orientation. In a large form factor device where there is a long interconnect distance between the host printed circuit board (PCB) and the USB Type-C receptacle, signals that are passed along this long interconnect may be subject to degradation across the interconnect.

BRIEF DESCRIPTION OF THE DRAWINGS

FIG. 4A is a table illustrating fields of an LBPM;
FIG. 4B is a table illustrating fields of an LBPM.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIEMENTS

Figure 1:
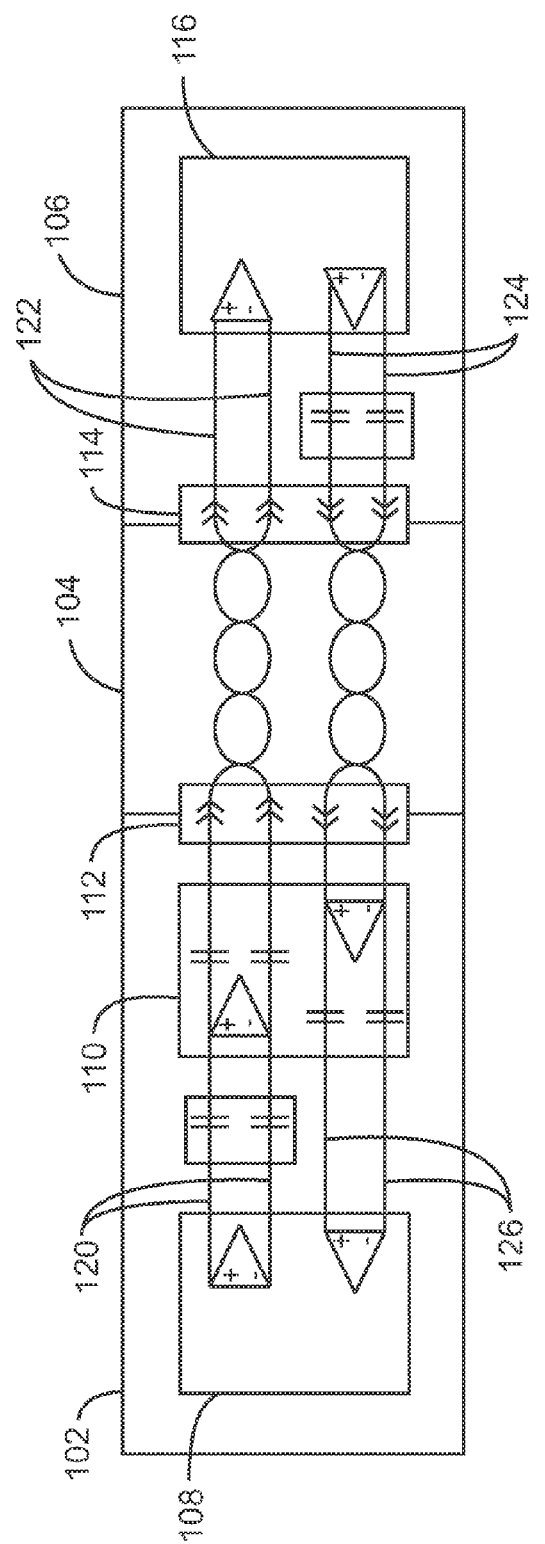
FIG. 1 is a diagram of an interconnect with a retimer.

Signals that travel across a long interconnect distance may be subjected to degradation. A retimer is a device that compensates for high-speed signal degradation through a galvanic channel. The use of the Type-C retimer is for channel extension in order to support a large form factor computing system that requires a long interconnect distance. A Type-C retimer can be used to retime or synchronize a signal to mitigate deterioration during signal transfer from one Type-C port to another. Accordingly, the Type-C retimer is to synchronize and regenerate deteriorated signals from a receiving port to a transmitting port. A plurality of Type-C retimers can be placed between a host port and a device port. As noted above, USB Type-C ports can be located such that a signal transferring data between the ports deteriorates while traveling from one port to another. Signals may also degrade when sent to and from USB Host Controllers, USB Hubs, USB Devices, or any combinations thereof. To restore signal quality to be standard compliant, a plurality of Type-C retimers can be placed between USB Type-C ports, host controllers, hubs, and devices.

Embodiments described herein enable a Type-C retimer that upon power on, remains in a low power state while waiting on a Type-C port to configure itself. In embodiments, the Type-C port can configure itself for several operational modes, including but not limited to protocols such as the Universal Serial Bus Revision 3.1 Specification released on Jul. 26, 2013; Peripheral Component Interconnect Express (PCI-E) announced Nov. 29, 2011; or DisplayPort 1.3 (DP), for example. Although the retimer may be referred to as a Type-C retimer, the present techniques can be used with any retimer that supports multiple modes or protocols. Additionally, while a retimer is described herein, the present techniques may apply to any repeater, such as a retimer, a redriver, or any combination thereof.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it is a singular purpose of most fabrics to provide highest possible performance with maximum power saving. Below, a number of interconnects are discussed, which would potentially benefit from aspects of the invention described herein.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a diagram of an interconnect 100 with a retimer. The interconnect 100 spans across a host printed circuit board (PCB) 102, a cable assembly 104, and a device PCB 106. The terms host and device as used to refer to the host PCB 102 and the device PCB are for descriptive purposes. The host PCB 102 can be configured as a host or device, and the device PCB can be configured as a host or device. Accordingly, the host PCB 102 includes a dual role port (DRP) 108 and a retimer 110. The DRP 108 can shift to an appropriate connection mode in response to negotiations with the component (such as the device 106) connected to the DRP 108. For example, when the negotiated device type is a host device, the DRP is able to be configured as a host port. Similarly, when the negotiated device type is a device, the DRP is able to be configured as a device port. Moreover, the Type-C retimer 110 may support USB 3.1 functionality, as well as alternate modes such as PCI-E, DP, and any other suitable high speed I/O protocols capable of transmission using a USB Type-C connector.

A Type-C receptacle/connector combination 112 represents the connection of a receptacle of the host 102 to a Type-C plug of the cable assembly 104. Another Type-C receptacle/connector combination 114 represents the connection of a receptacle of the device 106 to a Type-C plug of the cable assembly 104. The cable assembly may be an active cable or passive cable. In some cases, the communication across the interconnect is high speed communication.

Pins included in the USB Type-C connector include SuperSpeed pins, USB 2.0 pins, Auxiliary pins, Power pins, Ground pins, and Configuration channel (CC) pins. SuperSpeed signals are used to implement USB 3.1 signaling, while the USB 2.0 pins as used to implement USB 2.0 functionality. The Auxiliary Signal Pins are used for sideband signaling. CC pins are used to detect connections, determine plug orientation, and function as internconnect for baseband PD 2.0 communications to configure the interface across the USB Type-C cables and connectors. Power pins include Vbus and Vconn. Vbus is used to deliver power for standard USB operation as well as system operation and battery charging based on PD 2.0. Vconn is applied to the unused CC pin to supply power to the active cable. The Ground pin includes a ground return current path.

The device PCB 106 includes a device port 116. In embodiments, the device port 116 is a dual role port that can be configured as a host or a device. In embodiments, configuration of a relationship between the two ports is determined via the configuration channel. The configuration channel can be used in the discovery, configuration, and management of connections across a USB Type-C interconnect. Moreover, the CC can be used to set up and manage power and Alternate/Accessory Modes. In some cases, the USB Type-C interconnect can shift the USB Power Delivery communication protocol from being communicated over the VBUS to being delivered across the USB Type-C configuration channel. USB Power Delivery refers to the USB Power Delivery Specification, Revision 2.0, released Aug. 11, 2014.

A device may include several USB Type-C ports that can operate as a downstream facing port (DFP) or an upstream facing port (UFP). The type of port may be dynamic and can alternate between a DFP or a UFP as negotiated by the devices. A USB Type-C connector includes at least two pins, CC1 and CC2, used to configure a DFP-to-UFP connection. A DFP-to-UFP attach is detected by a host or hub port (DFP) when one of the CC pins at its USB Type-C receptacle senses a specified resistance to a ground (GND) pin. Subsequently, DFP-to-UFP detach is detected when the CC pin that was terminated at its USB Type-C receptacle is no longer terminated to GND. The USB Type-C connectors can be inserted in either right-side-up or upside-down position. Accordingly, although all signal pins are not described, two sets of signal pins are present to enable the flipping feature of the Type-C as described in the USB Type-C Specification.

A differential pair 120 may transmit data from the host port 108 that is received by a differential pair 122 at the device port 116 to enable USB 2.0 support across the USB Type-C interconnect 100. Similarly, a differential pair 124 may transmit data from the device port 116 that is received by a differential pair 126 at the host port 108 across the USB Type-C interconnect 100. Each differential pair may be considered a lane of the interconnect 100. As illustrated, there are two data lanes in FIG. 2. Two data lanes are illustrated for descriptive purposes, however, any number of data lanes may be present. For example, signaling lines between the host port 108 and the device port 116 may include a plurality of SuperSpeed differential pairs (SSRXP1 and SSRXN1) to enable SuperSpeed support across the USB Type-C interconnect 100. Additionally plurality of USB 2.0 differential pairs (Dp1 and Dn1) may enable support for USB 2.0 signaling across the interconnect 100.

The retimer 110 can apply a gain to the Type-C signals such that any channel loss is minimized as the signal travels long the interconnect 100. Channel loss is a degradation of an electrical signal that is transmitted through a conductor, for example, an interconnect cable. Channel loss degrades the integrity of the signal that is transmitted and received across the interconnect cable. A small level of channel loss is permitted when there is only minimal degradation of the signal. A channel loss of 7 decibels (dB) is a permitted level per the USB 3.1 Type-C Cable and Connection Specification released on Aug. 11, 2014. Without a retimer, a 7 dB channel loss at 10 Gb/s USB 3.1 operation results in a physical limitation between a Type-C port and the Type-C receptacle of about three to four inches of the interconnect on an FR4 board. If the physical spacing between the Type-C port and the Type-C receptacle was any greater, a channel loss of more than 7 dB could occur. The Type-C Specification permits a channel loss of 6 dB across the cable assembly. As a result, without a retimer, the interconnect 100 permits a total channel loss of 20 dB, which is the total sum of a 7 dB loss between both ports and receptacles and a 6 dB loss at the cable.

When a Type-C retimer 110 is implemented on the host PCB 102, the Type-C retimer 110 enables the interconnect to tolerate a greater amount of channel loss while maintaining the integrity of the Type-C signaling across the interconnect 100. In embodiments, the retimer enables the interconnect to tolerate an additional 20 dB of channel loss from the host port 108 to the retimer 110, which results in a combined channel loss from the host port 108, to the retimer 110 to the receptacle/plug 112 of 27 dB. This results in a physical distance between a Type-C port and the Type-C receptacle, including the timer, of about ten inches or more of the interconnect on an FR4 board. A total channel loss of approximately 40 dB can be tolerated across the entire interconnect 100 with the retimer 110, while maintaining the integrity of the transmitted signal.

The diagram of FIG. 1 is not intended to indicate that the interconnect 100 is to include all of the components shown in FIG. 1. Any number of additional components may be included within the interconnect 100, depending on the details of the devices and specific implementation of the Type-C retimer described herein. For example, the items discussed are not limited to the functionalities mentioned, but the functions could be done in different places, or by different components.

Figure 2:
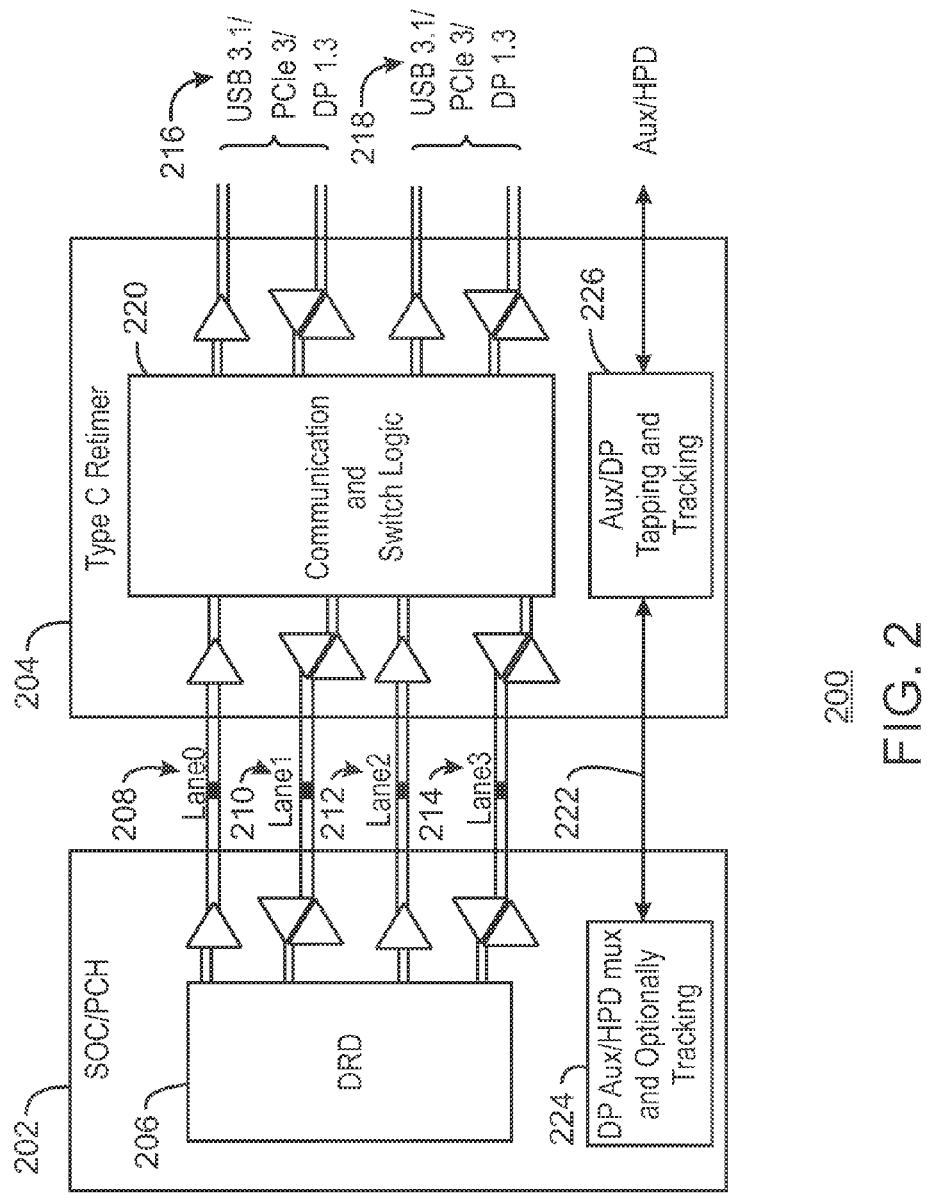
FIG. 2 is a diagram of an interconnect.

FIG. 2 is a diagram of an interconnect 200. The interconnect 200 may span across an SoC or a Peripheral Control Hub (PCH) to a Type-C retimer 204. Accordingly, while the SoC 202 is described herein, the SoC 202 could also be a PCH or any other controller. In embodiments, the interconnect 200 is a high-speed interconnect between a USB Type-C DRP 206 on the SOC 202 and the retimer 204. In embodiments, the USB Type-C interconnect may achieve a data transfer speed of at least 10 gigabytes per second, and may enable bi-directional power transfer that is reversible, such that power can be delivered either from the host to the device or from the device to the host.

The DRP 206 can support various communication protocols, such as DisplayPort 1.3, PCIe3, and USB 3.1. In embodiments, the DRP 206 enables protocol multiplexing such that a communication protocol can be selected from the various communication protocols supported according to the Type-C Specification. As illustrated in FIG. 2, a lane0 208 and a lane1 210 can create a first transmission set 216, while a lane2 212 and a lane3 214 can create a second transmission set 218. Each of the transmission set 216 and the transmission set 218 can be configured to transmit and receive data according to a USB 3.1, PCIe3, DP 1.3, or any other protocol supported by a USB 3.1 port. Since the DRP may be configured to support more than one protocol at a time, the retimer 204 may be configured for single protocol support or multiple protocol support. The DRP 206 selects which protocols are active based on configuration channel data received at a Type-C connector. In embodiments, lane0 208 and lane1 210 may form a default communication channel to enable the DRP 206 to configure the retimer 204. As used herein, a lane is a differential pair used to transmit data. Since the DRP configures the retimer, the retimer does not perform any Type-C initialization, including connect and orientation detection, and USB Power Delivery 2.0 protocol negotiation for input/output configuration.

For exemplary purposes, triangles disposed on each lane illustrates the direction of data on that lane. The lane0 208 and lane2 212 each transmit data from the DRP 206 to the Type-C retimer 204. The lane1 210 and the lane3 214 each transmit data from the DRP 206 to the Type-C retimer 204, and also transmit data from the Type-C retimer 204 to the DRP 206. Communication and switch logic 220 at the retimer 204 illustrates the direction of data across each of lane0 208, lane1 210, lane2 212, and lane3 214. A DisplayPort specific auxiliary channel 220 is present on the interconnect 200 in the event the Type-C retimer 204 also supports DisplayPort. Accordingly, a DisplayPort auxiliary and hot plug detect (HPD) multiplexing 224 on the SoC 202 enables the auxiliary Display Port signaling, while an auxiliary DisplayPort tapping and tracking 226 supports DisplayPort on the retimer 204.

The diagram of FIG. 2 is not intended to indicate that the interconnect 200 is to include all of the components shown in FIG. 2. Any number of additional components may be included within the host PCB 200, depending on the details of the devices and specific implementation of the Type-C retimer described herein. For example, the items discussed are not limited to the functionalities mentioned, but the functions could be done in different places, or by different components. Further, the additional logic performing Type-C connectivity detect, connect orientation, and I/O configuration based on CC1/CC2, among others, is not included in FIG. 2 but is present in interconnects as described herein.

As noted above, the DRP selects which port or ports are active based on configuration channel (CC) data received from a Type-C connector. Data lanes can be used to form a default communication channel to enable the DRP to configure the retimer. In particular, the DRP configures the retimer via a low-frequency periodic signal (LFPS). In particular, the Type-C retimer may include an LFPS receiver that can receive an LFPS Based Pulse-width modulation Message (LBPM) from the DRP. The LBPM is a configuration message from the DRP that includes information that the retimer can use for configuration. The configuration message can be an inband LBPM. Accordingly, the present techniques may be implemented without any sideband signaling.

In embodiments, pulse width modulation (PWM) can be constructed based on modulating the ratio between the LFPS and the LFPS electrical idle within a defined bit time period. During a bit time period, the duty cycle of LFPS over bit time period can be used to indicate the particular bit value sent depending on the location of the pulse within the time period. The bit value may be a logic level one or a logic level zero, depending on the duty cycle. The LBPS can be used to create a LFPS Based Pulse-width modulation Message (LBPM). The LFPS, LBPS, and LBPM are signaling and messaging techniques each defined by the USB 3.1 protocol.

Figure 3:
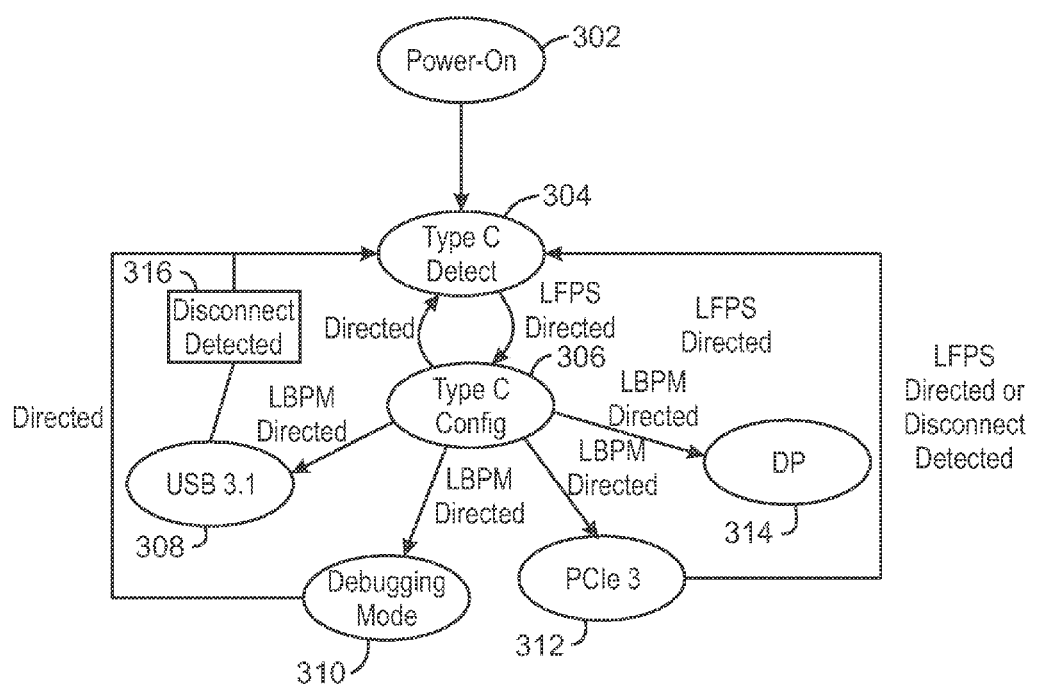
FIG. 3 is a diagram of a state machine illustrating possible configurations of a Type-C retimer.

FIG. 3 is a diagram of a state machine 300 illustrating possible configurations of a Type-C retimer. The configuration of the retimer is directed by inband messages from a DRP to the retimer. A power-on event occurs at block 302. Upon power-up, the retimer is in a waiting mode wherein the retimer waits for configuration. In embodiments, the waiting mode is a Type-C detect mode at block 304. The Type-C detect mode is a very low power state where the retimer presents its low receiver termination, similar to a USB 3.1 port to indicate its presence. During the Type C Detect state where the retimer is expecting configuration information, the host 108 is performing Type C connect detection, and executing PD 2.0 protocol upon connect detection and plug orientation identification. Once a PD contract is negotiated between the two type C ports in terms of roles of DFP and UFP, and the IO protocols that may operate, the host 108 is ready to configure the retimer based on LBPM.

When the retimer detects an LBPM via its LFPS receiver (LFPS directed), the retimer performs Type-C configuration at block 306. The LBPM is sent inband over the USB Type-C interconnect, and the LBPM is detected by the Type-C retimer. The retimer will decode the LBPM according to a pre-defined table, as illustrated in FIG. 4A and FIG. 4B. The decoded LBPM provides instruction to the retimer on one or more operational states to be entered in response to the receipt of the LBPM. In the case of a single LBPM protocol, the retimer will send the same LBPM message received by the retimer's LFPS receiver back to the DRP (directed) as an acknowledgement of the reception of the LBPM. After the acknowledgement, the retimer will continue to monitor or poll its LFPS receiver. If no further LBPM is received, the retimer will transition to the corresponding state directed by the DRP, and as decoded from the LBPM. At the DRP, after the DRP has received the identical LBPM from the retimer as an acknowledgement of the desired configuration, the DRP will conclude the LBPM handshake, and also move to the corresponding operational state it has negotiated with its Type-C link partner and as it directed the retimer to support via the LBPM. As described herein, the Type-C link partner is the device that is coupled with the DRP via a Type-C connector.

Upon decode of the LBPM, the Type-C retimer can be directed by the LBPM (LBPM directed) to enter a USB 3.1 mode at block 308, a debugging mode at block 310, a PCIe mode at block 312, or a DisplayPort mode at block 314. When the Type-C retimer has entered the USB 3.1 mode at block 308, the retimer remains in a USB 3.1 mode until a disconnect of the link partner is detected at block 316. The retimer then returns to the Type-C detect mode at block 304. When the Type-C retimer has entered the debugging mode at block 310, the retimer remains in the debugging mode until it is directed to exit the debugging mode. The retimer then returns to the Type-C detect mode at block 304.

When the retimer is in the PCIe mode at block 312, the retimer can be directed via LFPS signaling to re-enter the Type-C detect mode at block 304. The retimer may also re-enter the Type-C detect mode at block 304 after a disconnect from the link partner occurs. Similarly, when the retimer is in the DisplayPort mode at block 314, the retimer can be directed via LFPS signaling to re-enter the Type-C detect mode at block 304.

Figure 6:
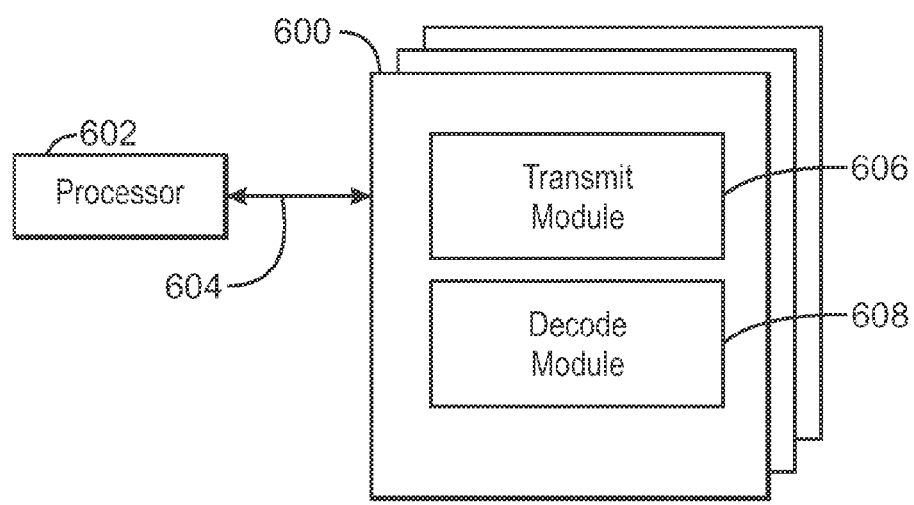
FIG. 6 is a block diagram showing tangible, non-transitory computer-readable media 600 that stores code for retimer configuration.

The diagram 300 of FIG. 3 is not intended to indicate that the Type-C configuration and control system is to include all of the components shown in FIG. 6. Any number of additional components may be included in the system, depending on the details of the devices and specific implementation of the Type-C retimer described herein. For example, the items discussed are not limited to the functionalities mentioned, but the functions could be done in different places, or by different components.

FIG. 4A is a table 400A illustrating fields of an LBPM. Although the bits are described as having particular values, the table illustrated herein is for exemplary purposes. Accordingly, any decode scheme may be used to decode the LBPM. In embodiments, the LBPM is an 8-bit LBPS with fields as described by the table 402A. In particular, a column 402 describes a "Field type" at bit zero (b0). Bit zero indicates the protocol type. The "Description" at column 404 describes the protocol type based on the value of bit zero. If bit zero is a logic level 0, the protocol type is a single LBPM protocol. If bit zero is a logic level 1, the protocol type is a multiple LBPM protocol.

A column 406 describes a "Sub-field" at bit one (b1) of the LBPM. After the single LBPM protocol is identified, bit one enables a selection of the I/O configuration of the retimer. Specifically, a column 408 is a "Description" field that identifies the particular I/O configuration based on the value of bit one. If bit one is a logic level 0, the LBPM is to configure the retimer in a non-DisplayPort mode. If bit one is a logic level 1, the LBPM is to configure the retimer in the DisplayPort mode.

A further "Sub-field" is described at column 410. When the bit one is a logic level 0 to indicate a non-DisplayPort mode, bit two (b2) and bit three (b3) indicate the particular I/O protocol configuration indicated by the LBPM. At column 412, if bit one is a logic level 0, bit two and bit three of the LBPM may be decoded in the following manner: 00 indicates a USB 3.1 protocol; 01 indicates a PCIe3 protocol; 10 indicates an debugging mode; and 11 may be reserved for future uses.

Additionally, at column 410, bit four (b4), bit five (b5), and bit six (b6) are reserved in this present table. However, as indicated at column 412, bit four (b4), bit five (b5), and bit six (b6) may be used as an extension for multi-lane PCIe or USB 3.1 configuration. Bit seven (b7), as described at column 410, can be used to determine the active lane. In embodiments, the active lane is the lane or lanes that will be used to carry the I/O communications. As described at column 412, if bit seven is a logic level 0, the active lane is in order. If bit seven is a logic level 1, the active lane is out order.

When bit one of the LBPM is a logic level 1 as described column 408, the "Sub-field" at indicated at column 410 includes the bit rate, lane configuration, and lane order corresponding to a Display Port configuration. In particular, bit two (b2), bit three (b3), and bit four (b4) can indicate the DisplayPort bit rate as follows: 000 indicates a reduced bit rate (RBR); 001 indicates a high bit rate 1 (HBR1); 010 indicates high bit rate 2 (HBR2), 011 indicates a high bit rate 3 (HBR3); and 1xx is reserved. In embodiments, 1xx is reserved to indicate USB_BR; rate matching. Rate matching may be as described by the embedded Display Port Specification 1.4 (eDP1.4). Bit five (b5) and bit six (b6) can indicate the lane configuration as follows: 00 indicates x1; 01 indicates x2; 10 indicates x4; and 11 is reserved. For example, with Display Port, a sink display device may only support single lane configuration, or 2-lanes/4 lanes configuration. Finally, bit seven (b7) indicates the lane order. As described at column 412, if bit seven is a logic level 0, the lane order is in order. If bit seven is a logic level 1, the lane order is out order.

FIG. 4B is a table 400B illustrating fields of an LBPM. FIG. 4B is a table 400B illustrating fields of an LBPM. Although the bits are described as having particular values, the table illustrated herein is for exemplary purposes. In embodiments, the LBPM is an 8-bit LBPS with fields as described by the table 400B. In particular, a column 420 describes a "Field type" at bit zero (b0). Bit zero indicates the protocol type. The "Description" at column 422 describes the protocol type based on the value of the bit zero. If bit zero is a logic level 0, the protocol type is a single LBPM protocol. If bit zero is a logic level 1, the protocol type is a multiple LBPM protocol.

A column 424 describes a "Sub-field" at bit one (b1), bit two (b2), bit three (b3), and bit four (b4) of the LBPM. After the single LBPM protocol is identified, bit one (b1), bit two (b2), bit three (b3), and bit four (b4) enables a selection of the plurality I/O configurations of the retimer. Specifically, a column 426 is a "Description" field that identifies the particular I/O configuration based on the value of bit one (b1), bit two (b2), bit three (b3), and bit four (b4) as follows in a basic feature for walkup or Type-C port: 0000 indicates a single port USB 3.1 configuration; 0001 indicates a single port DisplayPort configuration; 0010 indicates and USB 3.1 and DisplayPort configuration; and 0011 indicates an debugging mode configuration. In embodiments, a walkup port is a term commonly used to refer to any pluggable IOs, such as USB, DP, HDMI, eSATA, Ethernet. Additionally, The "Description" field at column 426 also identifies the particular I/O configuration based on the value of bit one (b1), bit two (b2), bit three (b3), and bit four (b4) as follows in a Dock extension or Type-C support Docking: 0100 indicates a single port PCIe configuration; 0101 indicates USB 3.1 and PCIe (with PCIe3 on a separate clock); 0110 indicates two USB 3.1 configurations; and 0111 indicates an PCIe3 and DisplayPort configuration (DPx2 with PCIe3 on a separate clock). In embodiments, a dock extension may be a walkup port with additional I/Os for docking purposes.

A column at reference number 428 indicates a sub-field, where bit five (b5) can be used to determine the active lane. As described at column 430, if bit five is a logic level 0, the active lane is in order. If bit five is a logic level 1, the active lane is out order. As indicated at column 426, bit six (b6) and bit seven (b7) are reserved when bit zero indicates a single LBPM protocol. Bit two through bit seven are reserved for a multiple-LBPM protocol configuration.

Figure 5:
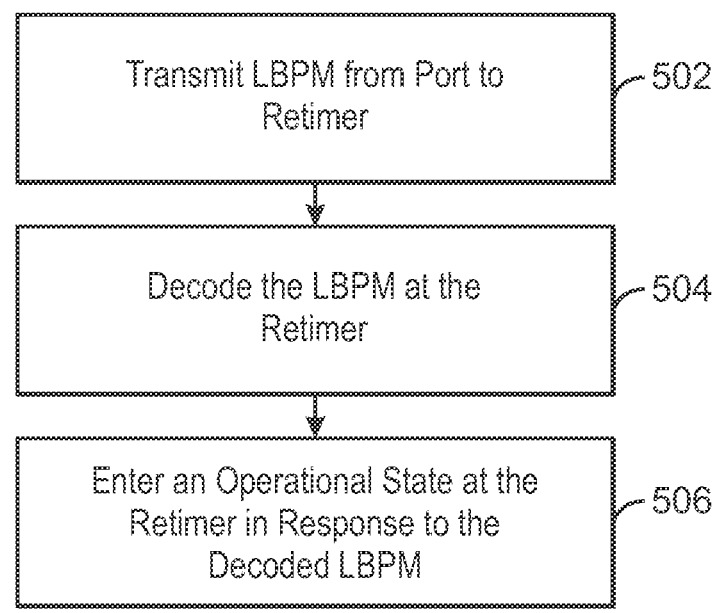
FIG. 5 is a process flow diagram of a method for configuring and controlling a Type-C retimer using an inband LBPM.

FIG. 5 is a process flow diagram of a method 500 for configuring and controlling a Type-C retimer using an inband LBPM. At block 502, an LBPM is transmitted from a port to the Type-C retimer. In embodiments, the port is a dual role port. Moreover, the retimer is in a low power state until an LBPM is received. In embodiments, the LBPM is a configuration LBPM. During the low power Type-C detect state, an LFPS receiver of the retimer is active in order to detect any LBPM sent from the DRP.

At block 504, the LBPM is decoded at the retimer. The LBPM signal is decoded based on forwarding tables, for example, such as the forwarding tables illustrated in FIG. 4A and FIG. 4B. In some embodiments, the protocol type is a single LBPM protocol, wherein a single LBPM indicates the desired operational state. Additionally, the protocol type may be a multiple LBPM protocol. A multiple LBPM protocol can be complimentary to single LBPM protocol by providing more comprehensive communications between the DRP and the retimer for more sophisticated operations, such configuration of the retimer's transmitter and receiver equalization coefficients, receiver/transmitter gain control, and etc.

At block 506, the retimer enters an operational state based on the decoded LBPM. In this manner, an appropriate mode of operation is established for the USB Type-C retimer. In some embodiments, the Type-C retimer can also support an alternate mode. Alternate modes enable additional connectivity through the USB Type-C cable connector. Alternate modes that the Type-C retimer can include, for example, DP, and PCIe. In embodiments where the Type-C retimer supports DP and enters into DP mode, a specific auxiliary channel will also be included for the retimer to participate in operation during DP training. In some embodiments, the auxiliary channel can be configured to be reused, and defined by DP to perform control and configuration of the Type-C retimer. In such an alternative example of establishing retimer control through the auxiliary channel, LBPM signals would be replaced by Aux channel signals as the inband signaling mechanism used to configure and control the Type-C retimer.

The method 500 of FIG. 5 is not intended to indicate that method 500 is to include all of the steps shown in FIG. 5. Further, any number of additional steps may be included within the method 500, depending on the details and specific implementation of the Type-C retimers described herein.

FIG. 6 is a block diagram showing tangible, non-transitory computer-readable media 600 that stores code for retimer configuration. The tangible, non-transitory computer-readable media 600 may be accessed by a processor 602 over a computer bus 604. Furthermore, the tangible, non-transitory computer-readable medium 600 may include code configured to direct the processor 602 to perform the methods described herein.

The various software components discussed herein may be stored on one or more tangible, non-transitory computer-readable media 600, as indicated in FIG. 6. For example, a transmit module 606 may be configured to transmit an LBPM from a port to the Type-C retimer. A decode module 608 may be configured to decode the LBPM. By decoding the LBPM at the retimer, an operational state of the retimer is discovered without sideband signaling. In embodiments, the retimer enters an operational state based on the decoded LBPM.

The block diagram of FIG. 6 is not intended to indicate that the tangible, non-transitory computer-readable media 600 is to include all of the components shown in FIG. 6. Further, the tangible, non-transitory computer-readable media 600 may include any number of additional components not shown in FIG. 6, depending on the details of the specific implementation.

Figure 7:
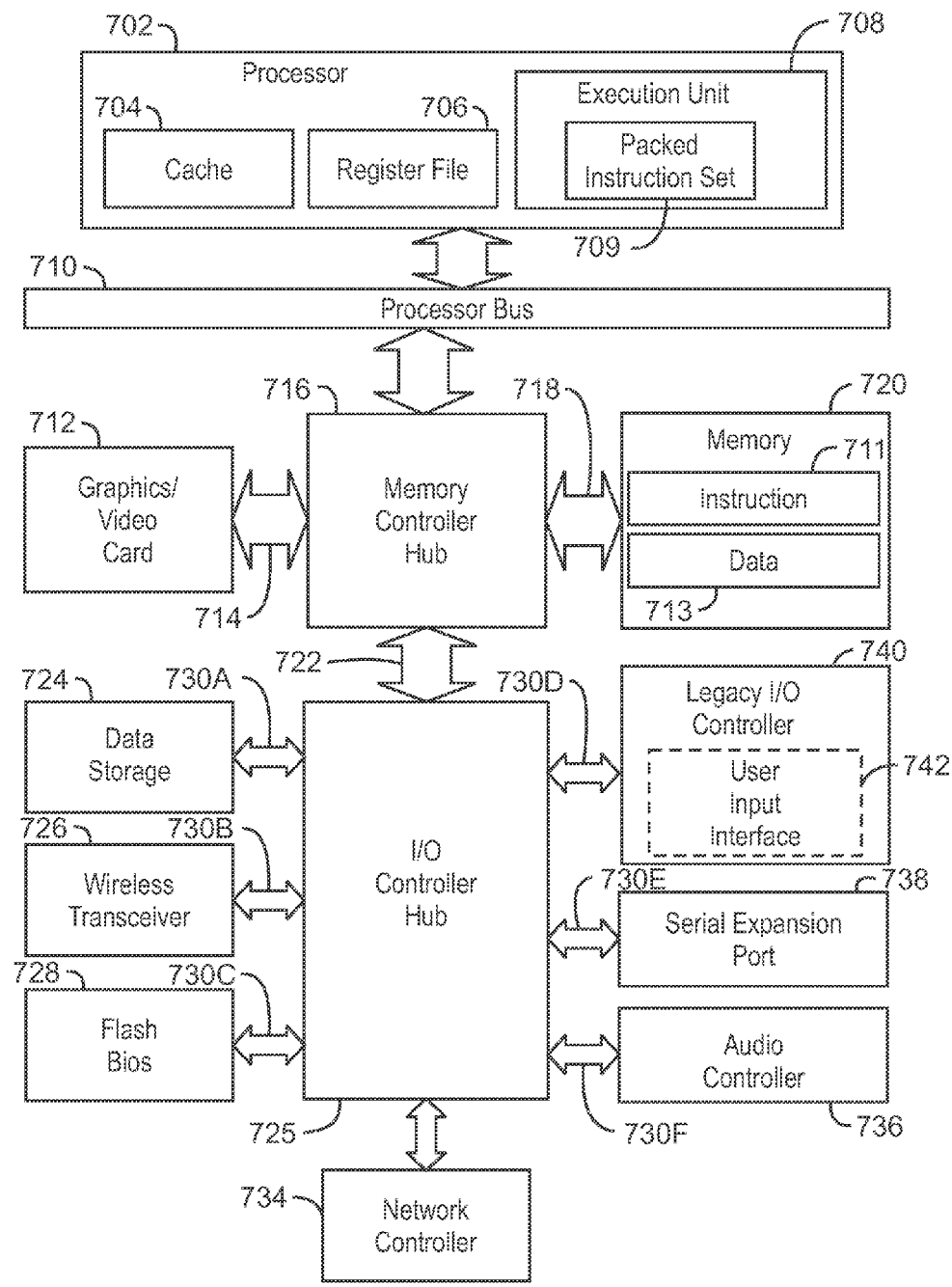
FIG. 7 is a block diagram of an exemplary computer system.

FIG. 7 is a block diagram of an exemplary computer system 700. The system 700 includes a processor with execution units to execute an instruction, where one or more of the interconnects implement one or more features in accordance with one embodiment of the present invention is illustrated. The system 700 includes a component, such as a processor 702 to employ execution units 708 including logic to perform algorithms for process data, in accordance with the present invention, such as in the embodiment described herein. In some cases, system 700 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In embodiments, system 700 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

The embodiments described herein are not limited to computer systems. Alternative embodiments of the present techniques can be used in other devices, such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 702 includes one or more execution units 708 to implement an algorithm that is to perform at least one instruction 711. One embodiment may be described in the context of a single processor desktop or server system, but alternative embodiments may be included in a multiprocessor system. System 700 is an example of a 'hub' system architecture. The computer system 700 includes a processor 702 to process data signals. The processor 702, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 702 is coupled to a processor bus 710 that transmits data signals between the processor 702 and other components in the system 700. The elements of system 700 (e.g. graphics accelerator 712, memory controller hub 716, memory 720, I/O controller hub 725, wireless transceiver 726, Flash BIOS 728, Network controller 709, Audio controller 736, Serial expansion port 738, I/O controller 740, etc.) perform their conventional functions that are well known to those familiar with the art.

In one embodiment, the processor 702 includes a Level 7 (L1) internal cache memory 704. Depending on the architecture, the processor 702 may have a single internal cache or multiple levels of internal caches. Other embodiments include a combination of both internal and external caches depending on the particular implementation and needs. Register file 706 is to store different types of data in various registers including integer registers, floating point registers, vector registers, banked registers, shadow registers, checkpoint registers, status registers, and instruction pointer register.

Execution unit 708, including logic to perform integer and floating point operations, also resides in the processor 702. The processor 702, in one embodiment, includes a microcode (ucode) ROM to store microcode, which when executed, is to perform algorithms for certain macroinstructions or handle complex scenarios. Here, microcode is potentially updateable to handle logic bugs/fixes for processor 702. For one embodiment, execution unit 708 includes logic to handle a packed instruction set 709. By including the packed instruction set 709 in the instruction set of a general-purpose processor 702, along with associated circuitry to execute the instructions, the operations used by many multimedia applications may be performed using packed data in a general-purpose processor 702. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 708 may also be used in micro controllers, embedded processors, graphics devices, DSPs, and other types of logic circuits. System 700 includes a memory 720. Memory 720 includes a dynamic random access memory (DRAM) device, a static random access memory (SRAM) device, flash memory device, or other memory device. Memory 720 stores instructions 711 and/or data 713 represented by data signals that are to be executed by the processor 702.

Note that any of the aforementioned features or aspects of the present techniques may be utilized on one or more interconnects illustrated in FIG. 7. For example, an on-die interconnect (ODI), which is not shown, for coupling internal units of processor 702 implements one or more aspects of the invention described above. The invention is associated with a processor bus 710 (e.g. Intel Quick Path Interconnect (QPI) or other known high performance computing interconnect), a high bandwidth memory path 718 to memory 720, a point-to-point link to graphics accelerator 714 (e.g. a Peripheral Component Interconnect express (PCIe) compliant fabric), a controller hub interconnect 722, and an I/O or other interconnect (e.g. USB, PCI, PCIe) 730A, 730B, 730C, 730D, 730E, and 730F for coupling the other illustrated components. Some examples of such components include the audio controller 736, firmware hub (flash BIOS) 728, wireless transceiver 726, data storage 724, legacy I/O controller 710 containing user input and keyboard interfaces 742, a serial expansion port 738 such as Universal Serial Bus (USB), and a network controller 709. The data storage device 724 can comprise a hard disk drive, a floppy disk drive, a CD-ROM device, a flash memory device, or other mass storage device.

The block diagram of FIG. 7 is not intended to indicate that the computing device 700 is to include all of the components shown in FIG. 7. Further, the computing device 700 may include any number of additional components not shown in FIG. 7, depending on the details of the specific implementation.

EXAMPLE 1

An apparatus is described herein. The apparatus comprises a port and at least one repeater. The port is to transmit a configuration message, and the at least one repeater supports multiple protocols, wherein the repeater is to wait in a low power state. In response to receiving the configuration message, the repeater is to decode the configuration message to be configured in an operational state.

The configuration message may be an inband LFPS based pulse width modulation message (LBPM). The repeater may receive the configuration message at an LFPS based receiver. A power delivery contract may be negotiated when a device is detected by the dual role port, a transfer protocol is determined, and the at least one repeater receives the inband LBPM from the dual role port. The port may receive the inband LBPM from the repeater in response to the port sending the configuration message. Optionally, the repeater may enter a configuration state, and wherein the configuration message is to be decoded by the repeater. An interconnect may be configured by entering a mode of operation based on the inband LBPM being decoded by the repeater. The inband LBPM may be decoded by the repeater based on a forwarding table. The forwarding table may decode the inband LBPM as a single LBPM protocol. Additionally, the forwarding table may decode the inband LBPM as a multiple LBPM protocol. Moreover, the repeater may support a USB 3.1 protocol. The repeater may also support a peripheral component interconnect express (PCIe) protocol. Further, the repeater may also support a display port 1.3 protocol. The at least one repeater may synchronize and regenerate deteriorated signals between the port and a receptacle. Also, the at least one repeater may support an alternate mode, and the at least one repeater may control acquisition and transmission of received signals. The repeater may be a USB Type-C repeater, and the receptacle may be a USB Type-C receptacle. The repeater may be a retimer, a redriver, or any combination thereof. Additionally, the port may be a single role port, a dual role port, a downstream facing port, or an upstream facing port.

EXAMPLE 2

A system is described herein. The system comprises a dual role port, a receptacle, and a repeater. A link comprising the repeater is to connect the dual role port and the receptacle, wherein the repeater is configured based on a configuration message from the dual role port.

The repeater may be in a low power state prior to the configuration message from the dual role port. The configuration message may be an inband low frequency periodic signal (LFPS) based pulse width modulation message (LBPM). The system may include a peripheral controller hub (PCH), wherein the dual role port can be disposed on the PCH. The system may alternatively include a system on chip (SOC), wherein the dual role port can be disposed on the SOC. The repeater may receive the configuration message at an LFPS receiver. A low power state of the repeater may be a Type-C detect power state. The repeater may synchronize and regenerate deteriorated signals from a receiving port to a transmitting port. The dual role port may receives an inband LBPM from the repeater as an acknowledgement from the repeater in response to the dual role port sending an inband LFPS to the repeater. The repeater may decode the inband LBPM based on a forwarding table. Additionally, the link between the dual role port, the repeater, and the receptacle may be configured by entering a mode of operation based on the LBPM message that is decoded by the repeater. The forwarding table may decode the inband LBPM as a single LBPM protocol or a multiple LBPM protocol. Moreover, the repeater, the dual role port, and the receptacle may support at least one of a USB 3.1 protocol, peripheral component interconnect express (PCIe) protocol, display port 1.3 protocol, or any combination thereof. The repeater may be a USB Type-C repeater. The receptacle may be a USB Type-C receptacle. The repeater may be a retimer, a redriver, or any combination thereof.

EXAMPLE 3

A method is described herein. The method includes transmitting an LBPM from a port to the repeater and decoding the LBPM by the repeater. The method also includes entering an operational state at the repeater in response to the decoded LBPM.

The LBPM may be decoded based on a forwarding table. The mode of operation may be USB 3.1, peripheral component interconnect express (PCIe), display port 1.3, or any combination thereof. The repeater may synchronize and regenerate deteriorated signals between a host port and a receptacle. Additionally, the repeater may be a USB Type-C repeater, or the receptacle may be a USB Type-C receptacle. Further, the repeater may be a retimer, a redriver, or any combination thereof.

EXAMPLE 4

A repeater is described herein. The repeater comprises a receiver, a transmitter, and a control. The receiver is to receive an inband message, wherein the inband message includes an inband low frequency periodic signal (LFPS) or an inband LFPS based pulse width modulation message (LBPM). A transmitter is to transmit the inband message. A control is to decode the inband LBPM based on forwarding tables, and configure the repeater based on the LBPM.

The repeater may support display port 1.3 (DP) protocol, and wherein the inband message further includes an auxiliary display port message. The transmitter may be coupled to a dual role port. The repeater may synchronize and regenerate deteriorated signals between the dual role port and a receptacle. Also, the repeater may enter a mode of operation, and wherein the mode of operation may include USB 3.1, peripheral component interconnect express (PCIe), display port 1.3, or any combination thereof. Further, the repeater may be a retimer, a redriver, or any combination thereof.

EXAMPLE 5

An apparatus is described herein. The apparatus comprises a dual role port, wherein the dual role port is to transmit a configuration message. The apparatus also comprises a means to decode the configuration message, wherein the means is to wait in a low power state, and in response to receiving the configuration message, the means is to decode the configuration message to be configured in an operational state.

The configuration message may be an inband LFPS based pulse width modulation message (LBPM). The means to decode the configuration message may receive the configuration message at an LFPS based receiver. A power delivery contract may be negotiated when a device is detected by the dual role port, a transfer protocol is determined, and the means to decode the configuration message receives the inband LBPM from the dual role port. The dual role port may receive the inband LBPM from the means to decode the configuration message in response to the dual role port sending the configuration message. Additionally, the means to decode the configuration message can enter a configuration state, and the configuration message may be decoded by the means to decode the configuration message. An interconnect may be configured by entering a mode of operation based on the inband LBPM being decoded by the means to decode the configuration message. The inband LBPM may be decoded by the means to decode the configuration message based on a forwarding table. The forwarding table can decode the inband LBPM as a single LBPM protocol. The forwarding table can also decode the inband LBPM as a multiple LBPM protocol. The means to decode the configuration message may support a USB 3.1 protocol. The means to decode the configuration message may also support a peripheral component interconnect express (PCIe) protocol. Moreover, the means to decode the configuration message may also support a display port 1.3 protocol. The means to decode the configuration message may synchronize and regenerate deteriorated signals between the dual role port and a receptacle. The means to decode the configuration message may support an alternate mode. Additionally, the means to decode the configuration message may control acquisition and transmission of received signals. The means to decode the configuration message may be a USB Type-C repeater. The receptacle may be a USB Type-C receptacle. Further, the repeater may be a retimer, a redriver, or any combination thereof.

EXAMPLE 6

A non-transitory, computer readable medium is described herein. The computer readable medium comprises code to direct a processor to transmit an LBPM from a port to a repeater and decode the LBPM by the repeater. The computer readable medium also comprises code to direct a processor to enter an operational state at the repeater in response to the decoded LBPM.

The LBPM may be decoded based on a forwarding table. The mode of operation may be USB 3.1, peripheral component interconnect express (PCIe), display port 1.3, or any combination thereof. The repeater may synchronize and regenerate deteriorated signals between a host port and a receptacle. Additionally, the repeater may be a USB Type-C repeater. The receptacle may also be a USB Type-C receptacle. Further, the repeater may be a retimer, a redriver, or any combination thereof.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

Some embodiments may be implemented in one or a combination of hardware, firmware, and software. The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc. which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus, comprising:
   a port, wherein the port is to transmit a configuration message, wherein the configuration message is an inband LFPS based pulse width modulation message (LBPM);
   at least one repeater that supports multiple protocols, wherein the repeater is to wait in a low power state, and in response to receiving the configuration message, the repeater is to decode the configuration message to be configured in an operational state.

2. The apparatus of claim 1, wherein the repeater is to receive the configuration message at an LFPS based receiver.

3. The apparatus of claim 1, wherein the port is to receive the same inband LBPM from the repeater in response to the port sending the configuration message.

4. The apparatus of claim 1, wherein the repeater is to enter a configuration state, and wherein the configuration message is to be decoded by the repeater.

5. The apparatus of claim 1, wherein an interconnect is to be configured by entering a mode of operation based on the inband LBPM being decoded by the repeater.

6. The apparatus of claim 1, wherein the inband LBPM is to be decoded by the repeater based on a forwarding table.

7. The apparatus of claim 1, wherein the repeater is a retimer, a redriver, or any combination thereof.

8. The apparatus of claim 1, wherein the port is a single role port, a dual role port, a downstream facing port, or an upstream facing port.

9. A system, comprising:
   a dual role port;
   a receptacle;
   a repeater, wherein a link comprising the repeater is to connect the dual role port and the receptacle, wherein the repeater is configured based on a configuration message from the dual role port, wherein the configuration message is an inband LFPS based pulse width modulation message (LBPM).

10. The system of claim 9, wherein the repeater is to be in a low power state prior to the configuration message from the dual role port.

11. The system of claim 9, wherein the configuration message is an inband low frequency periodic signal (LFPS) based pulse width modulation message (LBPM).

12. The system of claim 9, comprising a peripheral controller hub (PCH), wherein the dual role port is disposed on the PCH.

13. The system of claim 9, comprising a system on chip (SOC), wherein the dual role port is disposed on the SOC.

14. The system of claim 9, wherein the repeater is to receive the configuration message at an LFPS receiver.

15. The system of claim 9, wherein a low power state of the repeater is a Type-C detect power state.

16. The system of claim 9, wherein the repeater is a USB Type-C repeater.

17. The system of claim 9, wherein the receptacle is a USB Type-C receptacle.

18. A method, comprising:
   transmitting an LBPM from a port to the repeater;
   decoding the LBPM by the repeater;
   entering an operational state at the repeater in response to the decoded LBPM wherein the LBPM is decoded based on a forwarding table.

19. The method of claim 18, wherein the mode of operation is USB 3.1, peripheral component interconnect express (PCIe), display port 1.3, or any combination thereof.

20. The method of claim 18, wherein the repeater is to synchronize and regenerate deteriorated signals between a host port and a receptacle.

21. The method of claim 18, wherein the repeater is a USB Type-C repeater.

22. The method of claim 20, wherein the receptacle is a USB Type-C receptacle.

* * * * *